Nov. 9, 1948.  L. T. MART  2,453,522
METHOD OF PRODUCING WOOD PIPE
Filed Sept. 10, 1943  2 Sheets-Sheet 1

INVENTOR.
Leon T. Mart
BY
ATTORNEY.

Nov. 9, 1948.　　　　　L. T. MART　　　　　2,453,522
METHOD OF PRODUCING WOOD PIPE
Filed Sept. 10, 1943　　　　　　　　　　　2 Sheets-Sheet 2
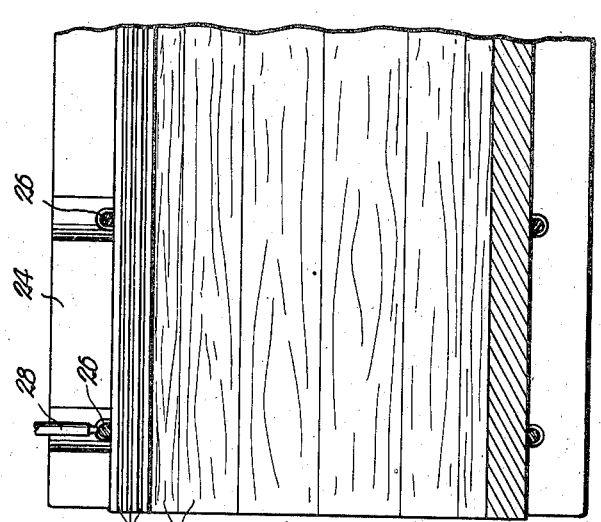
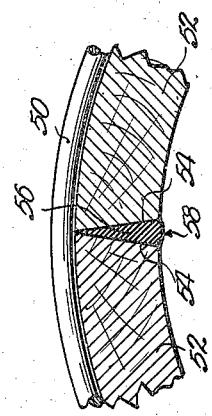
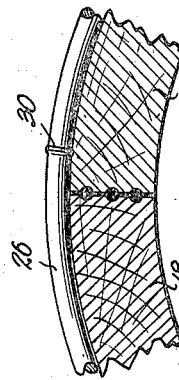
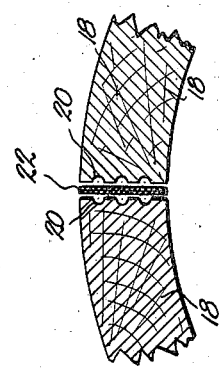
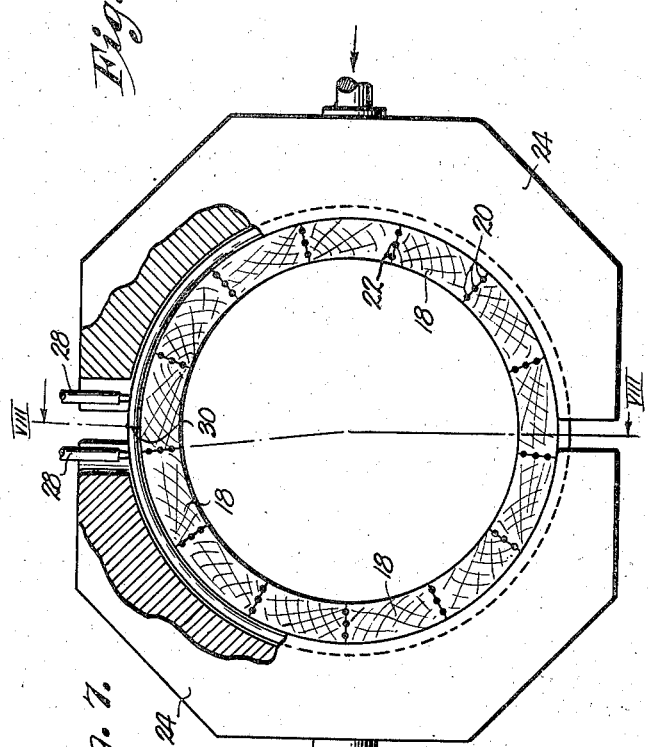
INVENTOR.
Leon T. Mart
BY
ATTORNEY.

Patented Nov. 9, 1948

2,453,522

UNITED STATES PATENT OFFICE 2,453,522

METHOD OF PRODUCING WOOD PIPE

Leon T. Mart, Mission Township, Johnson County, Kans., assignor to The Marley Company, Inc., Kansas City, Kans., a corporation of Kansas Application September 10, 1943, Serial No. 501,825

1 Claim. (Cl. 144—309)

This invention relates to the art of producing wood pipes or conduits, and the method of manufacturing such articles.

One of the important objects of the invention is to provide a wood pipe having a plurality of longitudinally disposed staves, which staves are held in assembled condition by bands adapted to maintain the longitudinal abutting edges of the staves in tight engagement with their specially formed faces, sealed together by deformable material that is compressed during the steps of assembling the pipe.

A further object of this invention is the provision of wood pipe of the aforementioned character, wherein the bands thereof are made of solid material formed into a rigid body while the staves of the pipe are held in compressed edge-to-edge relation.

Other objects of the invention include the manner of forming the abutting faces of longitudinally displaced staves; the way in which sealing material is deformed and compressed into place during the manufacture of the pipe; the unique manner in which impregnation of the staves by liquid in the nature of a preservative serves to expand the pipe body against circumscribing bands to establish a rigid self-supporting article; and the manner of welding together abutting ends of bands as the staves are held together by pressure-creating mechanism.

Further detailed objects of the invention, the manner of producing wood pipe in accordance with the foregoing broad objects, and the advantages arising from wooden pipe made in accordance with this invention, will arise during the course of the following specification, referring to the accompanying drawings, wherein:

Fig. 5 is an enlarged fragmentary sectional view through a portion of a wood pipe having a joint made in accordance with the present invention, and showing the elements of said joint prior to applying pressure thereto.

Fig. 6 is a fragmentary sectional view similar to Fig. 5 showing the condition of the joint elements after pressure has been applied and the band affixed.

Fig. 7 is a fragmentary diagrammatical sectional view through a wood pipe showing the manner of applying pressure to the staves thereof as the ends of one of the circumscribing bands are secured together by welding.

Fig. 8 is a fragmentary sectional view taken on line VIII—VIII of Fig. 7; and

Fig. 9 is an enlarged fragmentary detailed sectional view through a portion of two staves of the wood pipe showing another form of abutting edge which maintains sealing material in placing.

Figure 2:
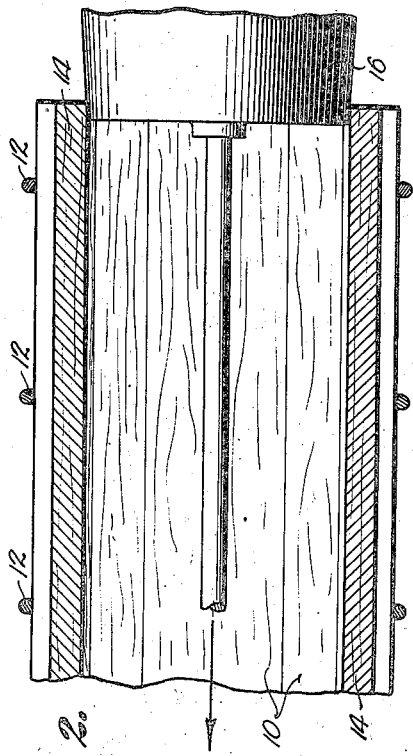
Fig. 2 is a fragmentary longitudinal sectional view through the pipe taken on line II—II of Fig. 1.
Figure 4:
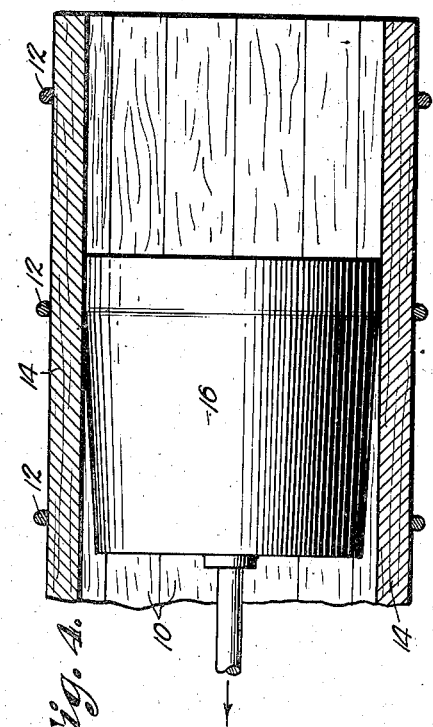
Fig. 4 is a longitudinal fragmentary sectional view taken on line IV—IV of Fig. 3.
Figure 1:
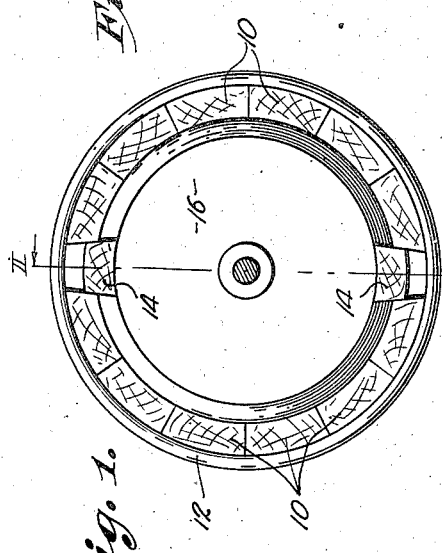
Fig. 1 is a transverse cross sectional view through a wood pipe showing the condition thereof prior to forcing two of the locking staves in place.
Figure 3:
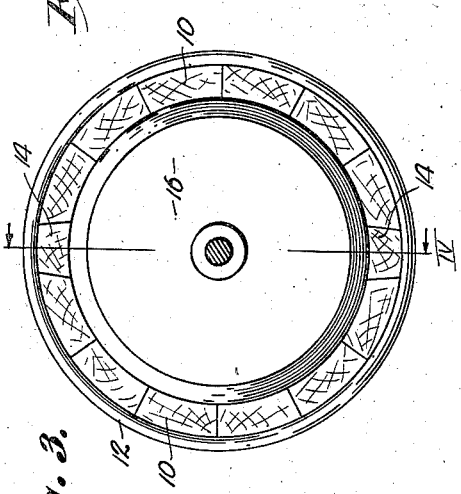
Fig. 3 is a transverse sectional view through the wood pipe after the locking sections have been moved to position.

Referring to Figs. 1 to 4, inclusive, the numeral 10 designates longitudinally disposed staves in edge-to-edge relation circumscribed by a solid, continuous band 12, any number of which may be used along the length of the pipe section. These rigid bands 12 should be strong enough to withstand the outward pressure exerted thereagainst when locking staves 14 are forced into normal position by ram 16.

Staves 10 have their abutting edges disposed on radial lines extending from the center of the pipe but locking staves 14 are wedge-shape in cross section and the longitudinal edges thereof diverge as the center of the pipe is approached.

Complementary edges on the staves to each side of locking stave 14 will receive pressure exerted by ram 16 through staves 14 during the assembly of the pipe. In other words, after staves 14 are forced outwardly against bands 12, pressure will be exerted between the abutting edges of staves 10 and a leak-proof pipe created. Ordinarily friction will retain these locking staves 14 in place, but any suitable fastening means, not here shown, may be applied to preclude accidental inward movement.

Locking staves 14 are diametrically opposed in order that ram 16 may move through the pipe section in the direction of the arrow shown in Fig. 2, with an advantageous balance conducive to quick and efficient manufacture.

Staves 10 may be loosely assembled within band 12 and thereafter subjected to expanding action incident to the application of liquid, in the nature of a preservative. Creosote or derivatives thereof, and other liquids capable of preserving wood, may be forced into the cells of the material from which staves 10 are made, whereupon these staves will expand and tighten and engage with bands 12 and with each other. The amount of expansion is dependent upon the type of material used, the pressure employed in treating the wood, and the character of preservative. If the stave is approximately 4 in. in width and if creosoting occurs, as is now commercially practiced, the expansion circumferentially of the pipe will amount to substantially ⅛ in. for each 4 in. stave incorporated in the body. Loose assembly of the staves, therefore, has been found desirable to prevent buckling, and any mandrel such as ram 16, may be employed within the pipe if the staves thereof are to be held in position during the treating operation. Wood pipe constructed through the employment of this method is practicable for the preservative is non-volatile and will remain in the stave material to prevent shrinking during the life of the pipe.

Where expansion due to impregnation is not desired, the staves 10 and 14, shown in Figs. 1 to 4 of the drawings, may be pre-treated and then moved to position by the force of ram 16 in the manner above described.

Pre-treated or untreated staves 18, illustrated in Figs. 5 to 8 inclusive, form parts of wood pipe that is assembled in a manner to seal the joints between the longitudinal abutting edges of said staves 18. Angular faces are formed along the edges of staves 18 and in the instance illustrated in Figs. 5 to 8 inclusive, grooves 20 are established to oppose each other when staves 18 are assembled.

Sealing material 22 of asphaltic character and in sheet form, is placed between the abutting longitudinal edges of staves 18 as the staves are brought together within jaws 24. Pressure exerted in the direction of the arrows shown in Fig. 7, will force together the staves 18 and deform the sealing material 22 in a manner shown in Fig. 6. Compression of this material 22 occurs and it is confined within grooves 20 to prevent leakage.

Bands 26 are applied to this form of wood pipe by compressing the same through the use of jaws 24 and welding the abutting ends thereof through the employment of electrodes 28 forming a part of resistance welding equipment, not here shown. The weld 30 is to one side of a joint created by the abutting longitudinal edges of adjacent staves 18 and after the weld has been established, jaws 24 may be withdrawn and a rigid pipe is the result.

A modified form of the invention is illustrated in Fig. 9. In this instance, band 50 circumscribes staves 52, the abutting edges 54 whereof are formed to establish a wedge-shaped space that is filled with sealing material 56. The outer marginal portions of abutting faces 54 are in engagement and any outward pressure upon the relatively wide face 58 of sealing material 56, will tend to force such material against faces 54, while it is confined in the wedge-shaped form.

From the foregoing it is apparent that wood pipe having exceptional durability, strength and confining characteristics for liquids may be produced, and while the manner of practicing the steps in the method of manufacturing wood pipe in accordance with this invention, has been diagrammatically illustrated, it has been rendered clear to one skilled in the art, that the method is unique and the pipe produced thereby is of a durable nature.

Having thus described the invention, what is claimed as new and desired to be secured by Letters Patent is:

The method of producing wood pipe having a body comprising longitudinally disposed staves circumscribed by a plurality of bands, which method consists in introducing sealing material between the abutting edges of the staves; applying inward pressure to both the staves and the bands to deform the sealing material into the contours of the opposed faces of said staves; and welding together the ends of the bands to produce a solid continuous member of each while said pressure is maintained.

LEON T. MART.

REFERENCES CITED

The following references are of record in the file of this patent:

UNITED STATES PATENTS

| Number | Name | Date |
|---|---|---|
| 77,285 | Holske | Apr. 28, 1868 |
| 149,080 | Stow | Mar. 31, 1874 |
| 325,809 | Bard | Sept. 8, 1885 |
| 393,833 | Jacobs | Dec. 4, 1888 |
| 448,990 | Parrish | Mar. 24, 1891 |
| 455,421 | Thomson | July 7, 1891 |
| 601,702 | Burgland | Apr. 5, 1898 |
| 1,316,385 | Murray | Sept. 16, 1919 |
| 1,325,923 | Baum | Dec. 23, 1919 |
| 1,954,183 | Schlesinger | Apr. 10, 1934 |
| 2,000,391 | Hutchings | May 7, 1935 |
| 2,038,172 | Haley | Apr. 21, 1936 |
| 2,049,371 | Haley | July 28, 1936 |
| 2,052,197 | Stuck | Aug. 25, 1936 |
| 2,090,415 | Homey | Aug. 17, 1937 |
| 2,315,742 | Shipman | Apr. 6, 1943 |
| 2,337,404 | Newton | Dec. 21, 1943 |
| 2,345,775 | Smith | Apr. 4, 1944 |

FOREIGN PATENTS

| Number | Country | Date |
|---|---|---|
| 88,370 | Sweden | Nov. 26, 1936 |